June 28, 1927.
J. H. PROCTER
1,633,954
WAFFLE IRON
Filed Sept. 12, 1925
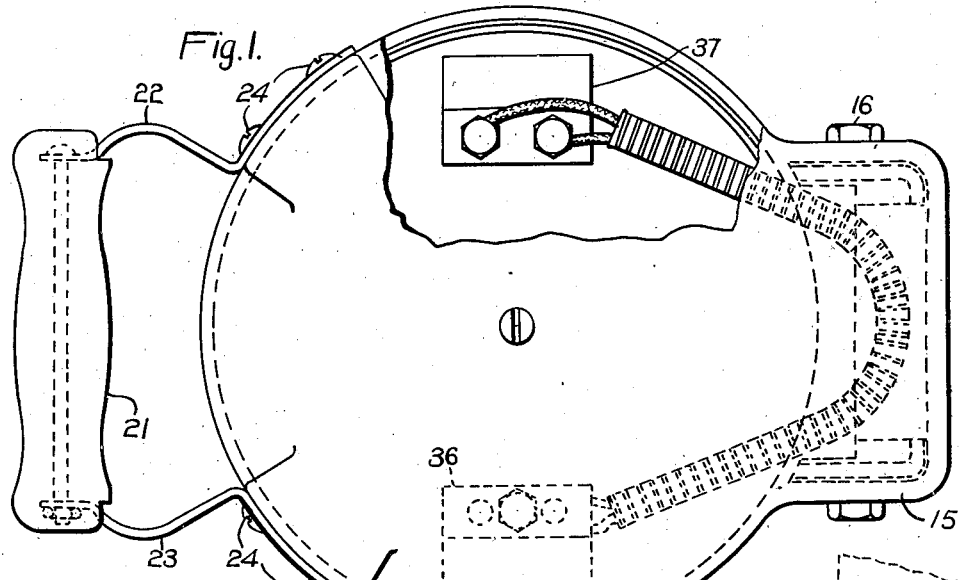
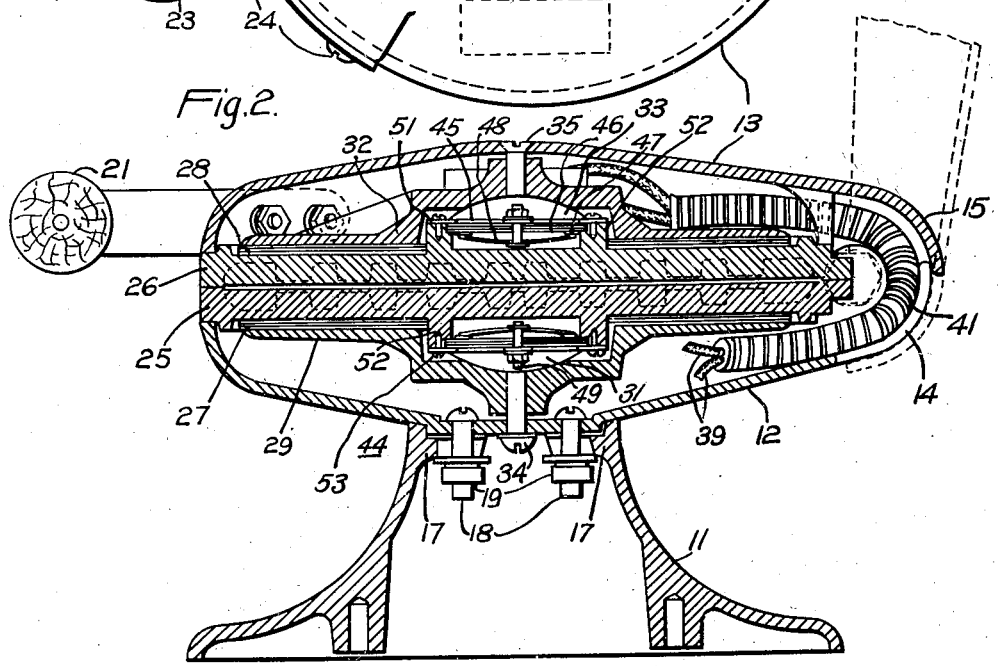
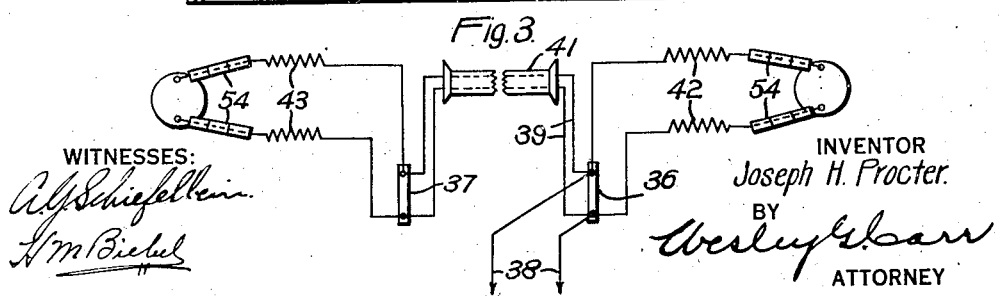
WITNESSES:
INVENTOR
Joseph H. Procter.
BY
ATTORNEY Patented June 28, 1927.

1,633,954

UNITED STATES PATENT OFFICE.

JOSEPH H. PROCTER, OF WILKINSBURG, PENNSYLVANIA, ASSIGNOR TO WESTINGHOUSE ELECTRIC & MANUFACTURING COMPANY, A CORPORATION OF PENNSYLVANIA.

WAFFLE IRON.

Application filed September 12, 1925. Serial No. 55,896.

My invention relates to electrically heated devices and particularly to electrically heated waffle irons.

An object of my invention is to provide a relatively simple construction for a plural-section electrically-heated device embodying a plurality of thermal control means for the heating elements thereof.

Another object of my invention is to provide means for maintaining all portions of a heating device at the same temperatures.

In practicing my invention, I provide a plural section electrically heated device, such as a waffle iron, with a thermally-actuable switch assembly operatively associated with the respective sections to control the same individually to thereby maintain each section at the same temperature or at desired different temperatures.

In the single sheet of drawings,

Figure 1 is a top plan view, with portions cut away, of a device embodying my invention, Fig. 2 is a view in vertical section therethrough, and Fig. 3 is a schematic diagram of connections employed in my invention.

A waffle iron comprises a base portion 11, a lower casing 12, and an upper casing 13, the two casings 12 and 13 being provided with rearwardly-extending portions 14 and 15 that are substantially rectangular in shape and that are adapted to receive a bolt 16 extending through the walls thereof to permit of pivotally mounting the casing 13 on the casing 12. The base member 11 comprises a hollow member that may be substantially circular in form and have a relatively large lower portion to rest upon a supporting means, and an upper, relatively narrow portion, that is provided with a plurality of internally recessed lugs 17 to receive holding members 18 that extend through the lower casing 12 and are constituted by machine screws and cooperating nuts 19.

The upper casing 13 is provided with a handle member 21 that is secured thereto by means of two straps 22 and 23 that have one of their respective ends secured against the casing by suitable machine screws 24.

A plurality of baking surfaces 25 and 26 are operatively mounted in the respective casing sections 12 and 13. A heating unit 27 is operatively associated with the baking surface 25 and a substantially similar heating unit 28 is operatively associated with the baking surfaces 26. The two heating units may be of any suitable or desired construction and, as they form no part of my invention, are here illustrated generally only as comprising a suitable resistor member and electric-insulating means for insulating the resistor member from the surrounding metal.

Means for clamping the heating unit 27 against the outer surface of the baking surface 25, comprises a member 29 that is substantially circular in contour and that is provided with a depression 31 in the center thereof. A substantially similar clamping member 32 is provided to permit of clamping the heating unit 28 against the outer surface of the baking surface 26, and suitable clamping means (not shown), such as machine screws, extend through the members 29 and 32 and into the cooperating baking surfaces to effect a close engagement between the members 29 and 25, and 32 and 26. The member 32 is provided with a central recess 33 similar to the recess 31 in the member 29.

The members comprising the baking surface 25, the clamping plate 29 and the heating element 27 are held in their proper operative position within the casing section 12 by a single central securing means 34 constituted by a machine screw projecting through the casing 12 and into the clamping member 29. The members 26, 32 and 28 are held in their proper operative position within the upper casing 13 by a single central securing means 35 constituted by a flat-head machine screw projecting through the upper casing 13 and into the clamping plate 32.

The lower clamping plate 29 has secured thereto a terminal-supporting plate 36, and the upper clamping plate 32 has secured thereon a similar terminal-member-supporting plate 37, as is more particularly illustrated in Fig. 1 of the drawing. Supply circuit conductors 38, illustrated schematically only in Fig. 3 of the drawing, are connected to the lower terminal supporting plate 36 and twin conductors 39 connect the terminal members on the plate 36 to the terminal members on the plate 37 and are preferably located within a flexible armored conduit 41.

The hereinbefore-mentioned resistors are illustrated schematically in Fig. 3 of the drawing and are there designated by the numerals 42 and 43, respectively, and are, of course, connected to the respective terminal members on the plates 36 and 37 by suitable conductors. The hereinbefore-described construction is more particularly disclosed and claimed in a co-pending application by K. Ehrgott, Serial No. 5046, filed January 27, 1925, and assigned to the Westinghouse Electric & Manufacturing Company.

My invention comprises more particularly the provision of individual thermally-actuable switch assemblies that are operatively associated with the respective baking surfaces in order that the temperatures thereof may be controlled individually. To this end, I provide a thermostatic switch assembly designated by the numeral 44 that is operatively associated with the baking surface 25 and a similar thermostatic switch assembly 45 that is operatively associated with the baking surface 26. Each of these thermally-actuable switch assemblies comprises a base portion 46 having mounted thereon suitable fixed contact members 47 and a bimetallic member 48 that is supported by a central pin 49 suitably mounted on the base member 46. The particular details of construction of this thermally actuable switch assembly form no part of my invention and are more particularly disclosed and claimed in copending application Serial No. 11,751, filed by J. A. Spencer, dated February 26, 1925, and assigned to the Spencer Thermostat Company.

An annular plate 51 serves to hold the thermostatic switch assembly in its proper operative position relatively to the baking surface, an annular portion 52 being provided on each of the baking surfaces and having a shoulder portion thereon to receive the base plate 46. A plurality of screws 53 secure the annular members 51 against the integral portions 52 of the baking surfaces.

It is obvious that the operating conditions to which the respective sections, or rather the baking surfaces, will be subjected are different and also that the heat interchange between the two baking surfaces is different. An operator may cause the waffle iron to be heated by the energization of the two heating units preferably when the two sections and baking surfaces are disposed in substantially the positions shown in Fig. 2 of the drawing.

When it is desired to bake waffles, the upper casing is raised and relatively cold batter is poured on the lower baking surface, whereby the temperature thereof is suddenly reduced. If the temperature of the lower baking surface was such, just prior to the pouring of the batter thereon, that the thermostat had operated to interrupt the circuit, the sudden reduction in the temperature of the baking surface would immediately result in a closing action of the thermostatic switch and a re-energization of the heating element associated with the lower baking surface. In order to permit independent operation or control of the two heating elements, they are connected in parallel circuit relation relatively to each other and the two thermally-actuable switch assemblies are connected in the respective circuits of the two heating elements as shown in Fig. 3 of the drawings.

Immediately after pouring the batter on the lower baking surface, the operator will lower the upper baking surface in proper operative position relatively to the lower baking surface and if the temperature of the upper baking surface was such, just prior to the lowering thereof, that the circuit of that heating element was interrupted, the sudden drop in the temperature of the upper baking surface, when it engages the upper surface of the fresh batter, will reduce the temperature of the baking surface and effect immediate re-energization of the upper heating element.

As the particular device herein described is intended for use in restaurants or hotels where the device should be available for instant use, it is indeterminate, in so far as the designer is concerned, as to what the relative positions of the two baking surfaces will be during the waiting periods, that is, the upper baking surface of the casing may be in the position illustrated in Fig. 2 or the upper casing may be in the position indicated by the broken lines in Fig. 2, namely, in a substantially vertical position.

It is evident that the heat interchanging relation between the two baking surfaces and sections may vary from time to time, in accordance with the relative angular positions of the two baking surfaces. It is also evident that the operating conditions of the two sections and the two baking surfaces will differ to a great extent and I have found it not only desirable but necessary to provide a thermally-actuable circuit-controlling device operatively associated with the respective heated members, in order that the temperatures thereof may be maintained at desired values irrespective of the position or operating condition of the other heating surface.

The provision of a substantially unitary thermally-actuable switch assembly permits of reducing to a minimum, the number of circuit conductors necessary, as the resistor members 42 and 43 may have one end of each connected to the terminal members 47 by suitably insulated conductors indicated generally by the numeral 54.

Various modifications may be made in the device embodying my invention without departing from the spirit and scope thereof and all such modifications are intended to be covered by the appended claims.

I claim as my invention:—

1. In an electrically heated device, the combination with a plurality of heating units, and a plurality of separate cooperating sections heated thereby, of a plurality of thermally-actuable means operatively associated with the respective heating units for controlling the energization thereof in accordance with a predetermined substantially constant temperature to be maintained in said sections.

2. In an electrically heated device, in combination, a pair of cooperating sections, subjected to different operating conditions, means for simultaneously heating said sections, and a plurality of thermally-actuable means operatively associated with the respective sections for individually controlling the heating thereof.

3. In an electrically heated cooking device, the combination with a pair of casings, baking surfaces operatively associated therewith, and heating means associated with the respective baking surfaces, of a plurality of thermally-actuable switch assemblies secured to the respective baking surfaces for controlling the energization of the respective heating means.

4. In an electrically heated device, the combination with a pair of cooperating sections, subjected to different operating conditions, heating units connected in parallel circuit relation with each other for individually heating the sections, of a plurality of thermostatic switches subjected to the operating temperatures of the respective sections for individually controlling the heating of the sections.

5. In a waffle iron, in combination, a lower baking surface, an upper baking surface, pivotally mounted relatively to the lower baking surface, separate heating units for the respective baking surfaces, and a plurality of thermally-actuable means operatively associated with the respective baking surfaces for maintaining them at substantially constant temperatures.

6. In a waffle iron, in combination, a lower baking surface, an upper baking surface subjected to varying rates of heat-interchange with the lower surface, a plurality of heating units operatively associated with the respective baking surfaces, and a thermally-actuable switch assembly operatively associated with each of the baking surfaces for maintaining the temperatures thereof substantially constant.

7. In a waffle iron, the combination with a plurality of cooperating baking members having baking surfaces thereon disposed in heat-interchanging relation with each other, and heating means associated with said members, of means thermally associated with said members for controlling said heating means and for maintaining said members at a predetermined substantially constant and equal operating temperature.

In testimony whereof, I have hereunto subscribed my name this 5th day of September, 1925.

JOSEPH H. PROCTER.